United States Patent
Wilson et al.

(10) Patent No.: US 12,093,102 B2
(45) Date of Patent: Sep. 17, 2024

(54) SYSTEM AND METHOD FOR POWER STATE ENFORCED SUBSCRIPTION MANAGEMENT

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 300 days.

(21) Appl. No.: 17/570,718

(22) Filed: Jan. 7, 2022

(65) Prior Publication Data

US 2023/0221784 A1    Jul. 13, 2023

(51) Int. Cl.
| | |
|---|---|
| *G06F 1/3203* | (2019.01) |
| *G06F 1/3287* | (2019.01) |
| *H04L 9/08* | (2006.01) |
| *H04L 9/32* | (2006.01) |
| *H04L 67/30* | (2022.01) |

(52) U.S. Cl.
CPC .......... *G06F 1/3203* (2013.01); *H04L 9/3273* (2013.01); *H04L 67/30* (2013.01)

(58) Field of Classification Search
CPC ...... G06F 1/3203; H04L 9/3273; H04L 67/30
See application file for complete search history.

(56) References Cited

U.S. PATENT DOCUMENTS

| | | | |
|---|---|---|---|
| 6,317,815 B1 | 11/2001 | Mayer et al. | |
| 6,421,727 B1 | 7/2002 | Reifer et al. | |
| 7,464,163 B1 | 12/2008 | Bantz et al. | |
| 9,178,948 B2 | 11/2015 | Chen et al. | |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Jaweed A Abbaszadeh
*Assistant Examiner* — Gayathri Sampath
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services. To improve the likelihood of the computer implemented services being provided, the managed systems may be managed using a subscription based model. The subscription model may utilize a highly accessible service to obtain information regarding desired capabilities (e.g., a subscription) of a managed system, and use the acquired information to automatically configure and manage the features and capabilities of the managed systems by powering and depowering select components.

20 Claims, 14 Drawing Sheets

(56) References Cited

U.S. PATENT DOCUMENTS

| | | | |
|---|---|---|---|
| 9,529,602 B1 | 12/2016 | Swierk et al. | |
| 9,705,995 B2 | 7/2017 | Edlund et al. | |
| 10,031,763 B1* | 7/2018 | Siebenthaler | G06F 13/4022 |
| 10,044,522 B1 | 8/2018 | Shamis et al. | |
| 10,262,309 B1* | 4/2019 | Chan | G06F 9/441 |
| 11,397,823 B1* | 7/2022 | Argenti | G06Q 30/01 |
| 11,588,909 B1 | 2/2023 | Wilson et al. | |
| 11,632,315 B1 | 4/2023 | Sawal et al. | |
| 11,671,379 B1 | 6/2023 | Wilson et al. | |
| 11,803,667 B2 | 10/2023 | Singh et al. | |
| 2003/0131028 A1 | 7/2003 | Radi et al. | |
| 2005/0122900 A1 | 6/2005 | Tuulos et al. | |
| 2005/0182843 A1 | 8/2005 | Reistad et al. | |
| 2006/0010477 A1 | 1/2006 | Yu | |
| 2006/0136747 A1 | 6/2006 | Ahdout et al. | |
| 2007/0091862 A1 | 4/2007 | Ioannidis | |
| 2007/0214193 A1 | 9/2007 | Takahashi et al. | |
| 2008/0235784 A1 | 9/2008 | Basner et al. | |
| 2008/0256641 A1 | 10/2008 | Lo | |
| 2009/0077407 A1* | 3/2009 | Akimoto | G06F 1/26 713/340 |
| 2011/0225574 A1 | 9/2011 | Khalidi et al. | |
| 2011/0289327 A1* | 11/2011 | Nolterieke | G06F 1/3287 713/300 |
| 2012/0005649 A1 | 1/2012 | Lavin | |
| 2012/0042388 A1 | 2/2012 | Rive et al. | |
| 2012/0076131 A1 | 3/2012 | Bianconi | |
| 2012/0144177 A1 | 6/2012 | Iyigun et al. | |
| 2012/0311673 A1 | 12/2012 | Sodah | |
| 2013/0007437 A1* | 1/2013 | Shroni | G06F 8/65 713/2 |
| 2013/0198346 A1 | 8/2013 | Jubran et al. | |
| 2013/0339306 A1 | 12/2013 | Kim et al. | |
| 2013/0347025 A1* | 12/2013 | Prakash | H04N 21/25875 725/25 |
| 2014/0074793 A1 | 3/2014 | Doering et al. | |
| 2015/0005033 A1 | 1/2015 | Petersson et al. | |
| 2015/0271276 A1 | 9/2015 | Edlund et al. | |
| 2015/0278323 A1 | 10/2015 | Melahn et al. | |
| 2015/0373012 A1 | 12/2015 | Bartz et al. | |
| 2016/0150396 A1 | 5/2016 | Milhizer | |
| 2016/0188868 A1* | 6/2016 | Otturu | G06F 21/44 713/1 |
| 2016/0231804 A1* | 8/2016 | Bulusu | G06F 1/3234 |
| 2017/0006119 A1 | 1/2017 | Pogrebinsky et al. | |
| 2017/0048713 A1 | 2/2017 | Guday et al. | |
| 2017/0090912 A1 | 3/2017 | Fuglsang et al. | |
| 2017/0244783 A1 | 8/2017 | Maresca | |
| 2017/0359356 A1 | 12/2017 | Brandwine | |
| 2019/0018715 A1 | 1/2019 | Behrendt et al. | |
| 2019/0044793 A1 | 2/2019 | Chew | |
| 2021/0067406 A1 | 3/2021 | Myers et al. | |
| 2021/0160255 A1 | 5/2021 | Cherkas et al. | |
| 2021/0342173 A1* | 11/2021 | Tsirkin | G06F 9/4812 |
| 2021/0360074 A1 | 11/2021 | Long | |
| 2022/0164838 A1 | 5/2022 | Wang | |
| 2022/0200928 A1 | 6/2022 | Garrison et al. | |
| 2023/0171586 A1 | 6/2023 | Holmes | |
| 2023/0221997 A1 | 7/2023 | Wilson et al. | |
| 2023/0222080 A1 | 7/2023 | Wilson et al. | |
| 2023/0222468 A1 | 7/2023 | Wilson et al. | |
| 2023/0222469 A1 | 7/2023 | Wilson et al. | |
| 2023/0222470 A1 | 7/2023 | Wilson et al. | |
| 2023/0222471 A1 | 7/2023 | Wilson et al. | |
| 2023/0224216 A1 | 7/2023 | Wilson et al. | |
| 2023/0229512 A1 | 7/2023 | Sawal et al. | |
| 2023/0229516 A1 | 7/2023 | Sawal et al. | |
| 2023/0229818 A1 | 7/2023 | Sawal et al. | |
| 2023/0232549 A1 | 7/2023 | Sawal et al. | |
| 2023/0342787 A1 | 10/2023 | Mohanty et al. | |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

Subscription Information Repository 164

Entry A 180

Subscription Identifier 182

Subscription Limitations 184

One or More Actions 186

Entry N 188

FIG. 1D

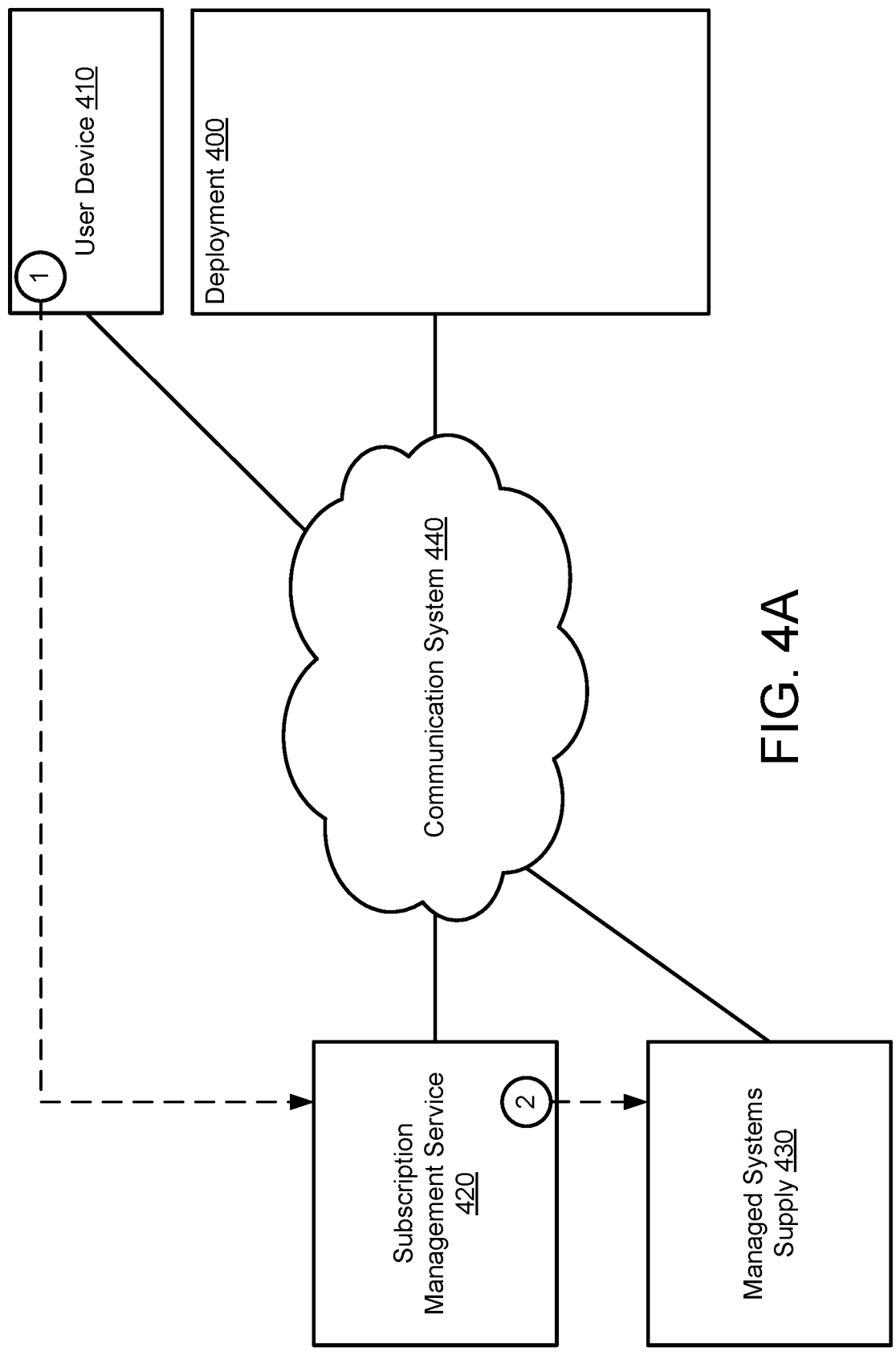

SYSTEM AND METHOD FOR POWER STATE ENFORCED SUBSCRIPTION MANAGEMENT

FIELD DISCLOSED HEREIN

Embodiments disclosed herein relate generally to system management. More particularly, embodiments disclosed herein relate to systems and methods to manage systems through hardware enablement and disablement.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 1D shows a block diagram illustrating a subscription information repository in accordance with an embodiment.

FIGS. 4A-4F show diagrams illustrating interactions between and actions of components of a system in accordance with an embodiment.

DETAILED DESCRIPTION

Figure 1A:
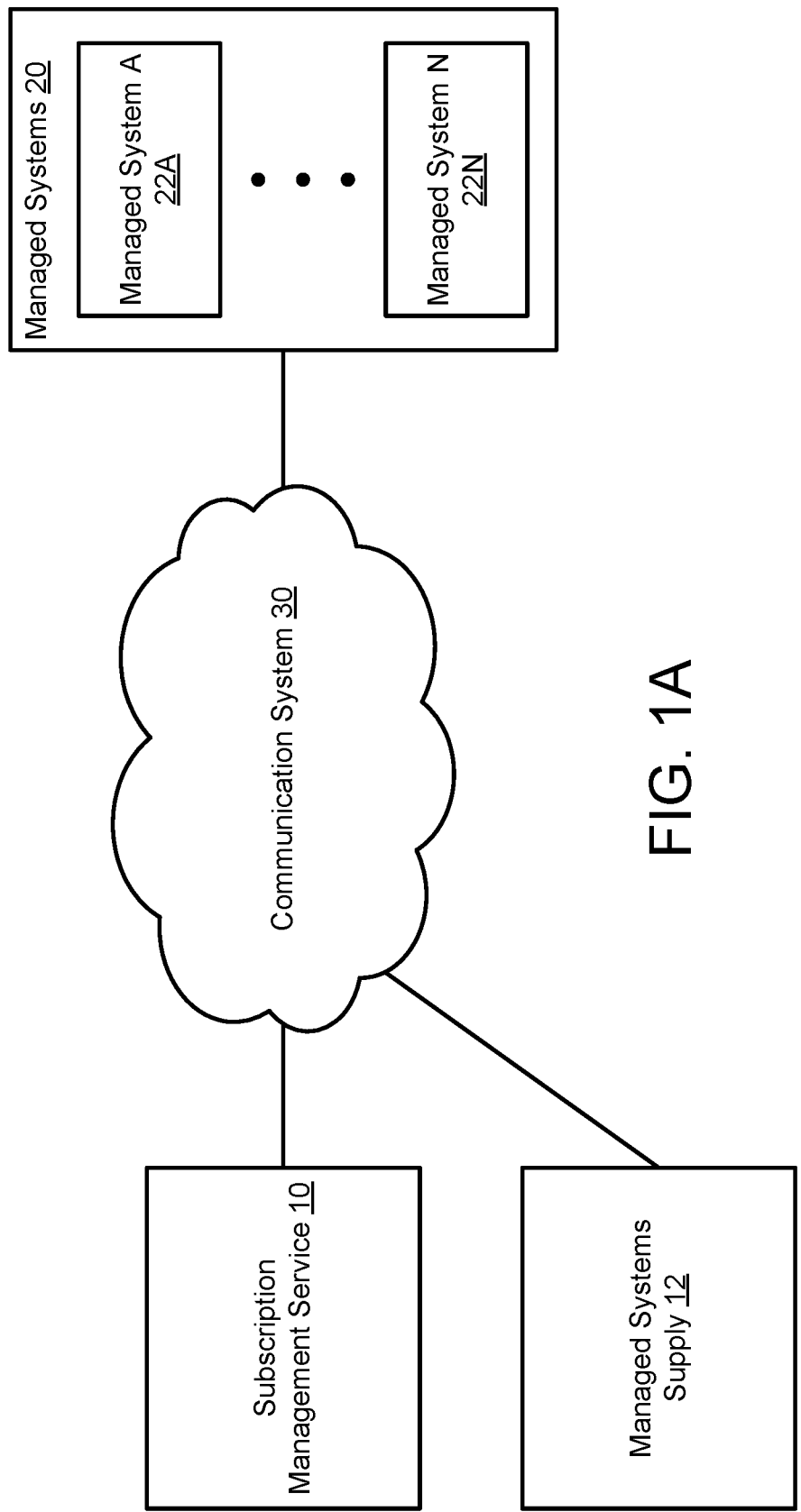
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources (e.g., and also software resources such as drivers, firmware, etc.) to provide the desired computer implemented services.

To improve the likelihood of the computer implemented services being provided, embodiments disclosed here relate to methods and systems for managing managed systems using a subscription based model. The subscription model may utilize a highly accessible service to obtain information regarding desired capabilities (e.g., a subscription) of a managed system, and use the acquired information to automatically configure and manage the features and capabilities of managed systems to meet those desired by users, operators, and/or other persons.

Additionally, the subscription model may provide for the automatic removal and/or disablement of functions and/or capabilities upon subscription limits being exceeded. The managed systems may host local subscription managers that include functionality to automatically enable and disable various components, to add and/or remove various software components, and/or otherwise manage the operation of the host devices. Consequently, the managed system may automatically be placed into compliance with subscriptions by the local subscription managers even under challenging circumstances such as, for example, limited and/or no communications with the subscription management service.

In an embodiment, the managed systems are managed by selectively powering and/or depowering some of the hardware resources of the respective managed systems to match corresponding subscriptions. Powering and/or depowering of the hardware resources may allow quantities of hardware resources corresponding to those subscribed to by a user of the managed systems to be utilized by the users of the managed systems.

In an embodiment, the hardware resources are selectively powered and/or depowered during a startup of the system. The powering and/or depowering may be performed during the startup such that unsubscribed to hardware resources may be disguised or otherwise concealed from management entities of the managed system, even though the hardware resources are still present and physically connected to (e.g., hosted by) the managed systems. Consequently, the quantity of hardware resources available to user of a managed system may be dynamically modified without needing to physically access or otherwise physically modify the hardware resources of the managed systems.

Consequently, the managed systems may be more likely to be able to provide the computer implemented services over time by virtue of the seamless and automatic compliance with the corresponding subscriptions associated with the managed systems.

In an embodiment, a computer-implemented method for operating a managed system is provided. The method includes obtaining, by a local subscription manager of the managed system, a subscription update for the managed system; making a determination that the subscription update is a valid subscription update; in response to the determination: updating, by the local subscription manager, a subscription information repository based on the subscription update to obtain an updated subscription information repository, the subscription information repository specifying hardware components of the managed system that are to be powered and the updated subscription information repository specifying at least one of the hardware components to be powered that is not to be powered; and enforcing, by the local subscription manager, the updated subscription information repository on the managed system.

The determination is made when it is determined that the subscription update originated from a subscription management service that is tasked with managing the managed system.

Determining that the subscription update originated form the subscription management service may include performing an authentication for the subscription update using, in part, a public key for the subscription management service.

Determining that the subscription update originated form the subscription management service may include performing an authentication for the subscription update using, in part, a bearer token embedded in the subscription update, the bearer token being issued by the local subscription manager to the subscription management service up successful completion of a public-private key exchange mutual authentication.

Enforcing the updated subscription information repository may include initiating a startup of the managed system; during the startup: making a second determination that the updated subscription information repository is changed from the subscription information repository; based on the second determination: updating enablement of one or more of the hardware components of the managed system based on a change between the updated subscription information repository and the subscription information repository to obtain a hardware component subscription compliant managed system; and completing the startup of the hardware component subscription compliant managed system.

Updating the enablement of the one or more of the hardware components may include depowering a hardware component of the one or more of the hardware components that was powered during previous startups while the subscription information repository governed power states of the hardware components of the managed system, or powering the hardware component of the one or more of the hardware components that was depowered during the previous startups while the subscription information repository governed the power states of the hardware components of the managed system.

Powering the hardware component may include instructing a power manager to supply power to the hardware component.

The power manager may include a power supply. The power manager may include a configurable power interconnect (e.g., switches) between a power supply and the hardware component.

Enforcing the updated subscription information repository may place the managed system in compliance with subscriptions maintained by a subscription management service.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
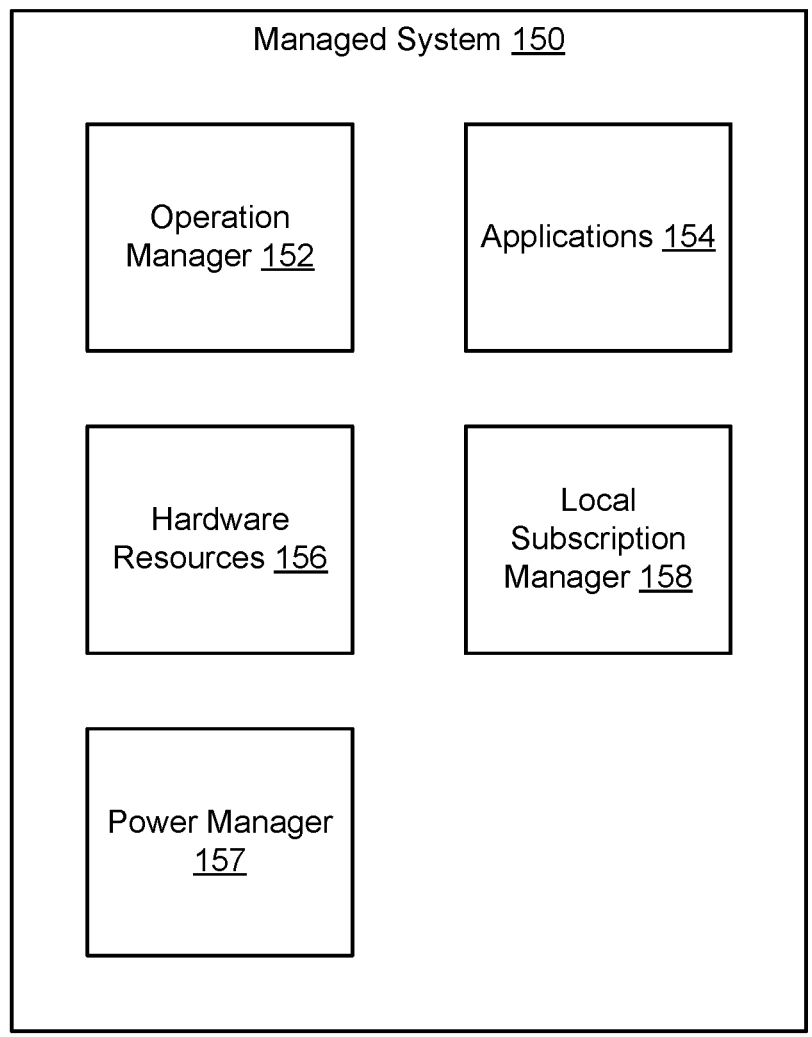
FIG. 1B shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components and/or applications may need to be implemented by managed systems 20 depending on the computer implemented services desired to be provided by the respective managed systems. Refer to FIG. 1B for additional details regarding managed systems 20.

However, determining these configurations of hardware and/or software components (e.g., applications) necessary for corresponding computer implemented services may be technically challenging to identify. For example, a person may need to be familiar with a range of hardware and software components issues to effectively select the hardware components and/or software components of a system so that the system is capable of providing the desired computer implemented services. Further, if a system is procured that lacks necessary hardware and/or software components, the procured system may not be able to provide its desired functions.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution. To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) select and deploy one or more managed systems 20 to a client site, (iii) correlate the desired functions with various hardware components (e.g., if explicit hardware components identifications are not made), and (iv) provide local subscription managers hosted by managed systems 20 with information regarding the identified hardware components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may obtain and configure managed systems 20 without needing to directly know specific capabilities of potential managed systems and/or interact with the various hardware and/or software components of managed systems 20 once deployed to a client site.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made one the basis that the requesting entity may be likely to request additional features and/or capabilities in the future. Consequently, managed systems 20, when deployed to a client site, may include sufficient hardware components to address a range of different use cases and solution, beyond those that may be immediately apparent to a requesting entity. The additional capabilities may take the form of, for example, additional processors, memory modules, storage devices, graphical processing units, network interface devices, and/or other types of hardware components.

The distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20. In this manner, the additional capabilities not requested by a requesting entity may be disabled from use by a use of managed systems 20, until such time as the requesting entity adds or otherwise changes subscriptions such that the additional capabilities are to be afforded to the users of managed systems 20.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. After an initial selection leading to deployment of managed systems 20 with additional capabilities beyond those usable by the user, the user may expand their subscription to allow for use of these additional capabilities. In response, subscription management service 10 may cooperate with local subscription managers hosted by managed systems 20 to reconfigure the operation of managed systems 20 to allow these additional features to be utilized by the users. Consequently, the underlying hardware of managed systems 20 may not need to be changed to allow for various capabilities of managed systems 20 available to user to be expanded or contracted, depending on whether a corresponding subscription is expanded or contracted.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to local subscription managers hosted by managed systems 20. Once sent, the local subscription managers may modify the operation of managed systems 20 such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 6.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 6), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

Figure 6:
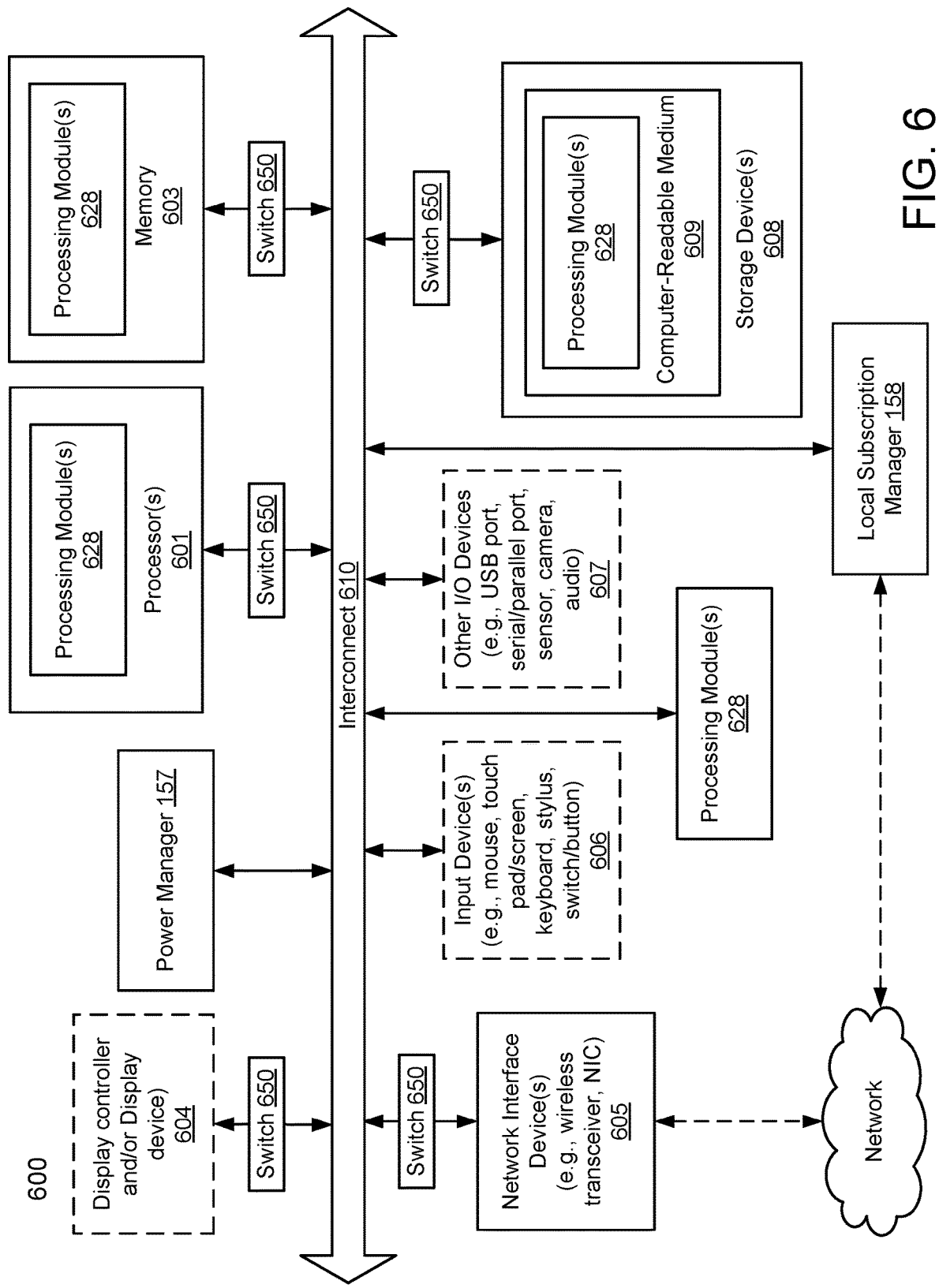
FIG. 6 shows a block diagram illustrating a computing device in accordance with an embodiment.

In addition (and/or alternatively) to any of the components shown in FIG. 6, managed system 150 may include operation manager 152, applications 154, hardware resources 156, power manager 157, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system or other type of operation management entity. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities).

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

Power manager 157 may provide power management services for hardware resources 156. The power management services may include selectively powering and depowering portions of hardware resources 156 to comply with corresponding subscriptions. Depowering one or more of hardware resources 156 may prevent the hardware resources from being used thereby allow managed system 150 to comply with corresponding subscriptions.

Power manager 157 may make power management decisions in coordination with local subscription manager 158. For example, power manager 157 may perform various power and depowering operations based on information provided by local subscription manager 158.

In an embodiment, power manager 157 is implemented with a power supply that allows for selective powering of various portions of hardware resources 156 (e.g., at any level of granularity).

In an embodiment, power manager 157 is implemented with functionality of an interconnect used to supply power to the hardware resources 156. The interconnect may be configurable (e.g., may include switches for powering/depowering purposes) such that various portions of hardware resources 156 may be selectively connected to and/or disconnected from a power but that otherwise provides power to hardware resources 156.

In an embodiment, power manager 157 is implemented with functionality of power control chip on a motherboard that interconnects the hardware resources 156. The power control chip may be adapted to selectively power various portions of circuitry that includes corresponding portions of hardware resources 156.

To facilitate power management in cooperation with local subscription manager 158, power manager 157 may be operably connected to local subscription manager 158 through one or more interconnects. Refer to FIG. 6 for additional details regarding interconnects. The interconnect may allow for these components to operably communicate with one another such that local subscription manager 158 may utilize or otherwise invoke the functionality of power manager 157 to manage hardware resources 156 available to users of managed system 150 in accordance with subscriptions maintained by subscription management service 10.

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions), and (v) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activing various deactivated hardware resources, (b) loading various information into storage and/or memory of managed system 150, (c) causing processors or other devices of hardware resources 156 to execute various code blocks to cause them to perform certain operations, and/or (d) any other types of actions to implement changes to managed system 150 to comply with a subscription. When doing so, local subscription manager 158 may send messages to power manager 157 (or use other means for communicating hardware component powering information) to invoke its functionality to selectively power and/or depower various hardware resources 156.

Likewise, the one or more actions to force managed system 150 to comply with the subscriptions may include (I) disabling various activated hardware resources, (II) removing various information from storage and/or memory of managed system 150, (III) causing processor or other devices of hardware resources 156 to execute other code blocks to cause them to perform certain operations to revert previous changes to the operation of managed system 150 and/or remove certain functionalities, (IV) invoking the functionality of power manager 157 to power/depower various hardware resources 156, and/or (V) any other types of actions to implement changes to managed system 150 to comply with a subscription, or lack thereof.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 610, shown in FIG. 6), and may operate independently from other components (e.g., hardware and software) of managed system 150. The management controller may include functionality to manage the operation, configuration, and/or other characteristic of any hardware and/or software component of managed system 150. For example, the management controller may include functionality to disable/enable components, reconfigure components, add new components (e.g., load additional applications for execution), etc. When enabling/disabling hardware resources 156, local subscription manager 158 may invoke the functionality of power manager 157 to selectively power/depower portions of hardware resources 156 such that only subscribed to hardware resources 156 (or portions of the resources/functionalities thereof) are available to users of managed system 150.

In an embodiment, the management controller includes a separate communication interface (e.g., from that of a communication interface of managed system 150) through which it communicates with subscription management service 10. In an embodiment, the management controller uses the same communication interface which managed system 150 uses to communicate with other devices. Either of these communication interface may facilitate communications with communication system 30, and devices connected to communication system 30 such as subscription management service 10.

Figure 1C:
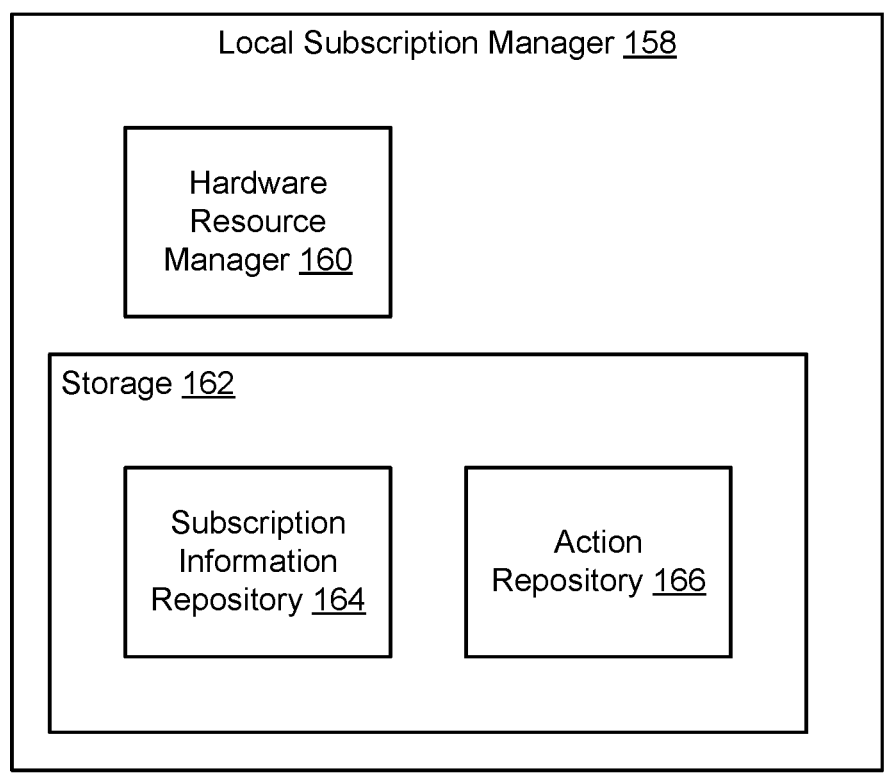
FIG. 1C shows a block diagram illustrating a local subscription manager in accordance with an embodiment.

When providing its functionality, local subscription manager 158 may perform all, or a portion, of the methods and operations illustrated in FIGS. 2-5. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 6. In addition (and/or alternatively) to any of the components shown in FIG. 6, local subscription manager 158 may include hardware resource manager 160 and storage 162. Each of these components is discussed below.

Hardware resource manager 160 may include functionality to (i) establish secure connections with and/or authenticate subscription management service 10, (ii) obtain information from subscription management service 10 via the secure connections, (iii) update subscription information repository 164 and/or action repository 166 based on the obtained information, and (iv) modify the configuration, function, and/or operation of a device that hosts local subscription manager 158 to conform to the information stored in subscription information repository 164 and/or action repository 166. To modify the configuration, function, and/or operation of a host managed system, hardware resource manager 160 may invoke the functionality of a power manager (e.g., by sending it communications with instructions) to selectively power/depower hardware resources of the host managed system. Doing so, may limit or expand the hardware resources available for use by a user of the host managed system in a manner that complies with the information in subscription information repository 164.

In an embodiment, hardware resource manager 160 is implemented using a hardware device including circuitry. The hardware device may be, for example, a digital signal processor, a field programmable gate array, or an application specific integrated circuit. The circuitry may be adapted to cause the hardware device to perform the functionality of hardware resource manager 160. Hardware resource manager 160 may be implemented using other types of hardware devices without departing embodiment disclosed herein.

In one embodiment, hardware resource manager 160 is implemented using a processor adapted to execute computing code stored on a persistent storage that when executed by the processor performs the functionality of hardware resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164 and action repository 166.

Subscription information repository 164 may be implemented with one or more data structures that store information regarding subscriptions for a device that hosts local subscription manager 158. Refer to FIG. 1D for additional details regarding subscription information repository 164.

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by hardware resource manager 160 when a condition is met, such as a subscription limit being exceeded.

In an embodiment, action repository 166 includes at least one set of actions keyed to additions and/or removals of subscriptions for a host managed system. The actions may include (i) restarting/initializing a host managed system, (ii) after doing so, interrupting a normal startup process performed by the host managed system prior to the host managed system identifying hardware resources available for use, (iii) while the normal startup process is interrupted, invoking the functionality of power manager to selectively power/depower various hardware resources of the host managed system based on the information included in subscription information repository 164, and/or (iv) resuming the normal startup process such that the host managed system is only available to recognize the presence of hardware resources that have been selectively powered. In this manner, various hardware resources that are outside of subscriptions of a user of the host managed system may be screen from use by users of the host managed system (e.g., because a startup management entity and/or resulting operation management entity such as an operating system may not be aware of the physical presence of depowered hardware resources).

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Turning to FIG. 1D, a diagram of subscription information repository 164 in accordance with an embodiment is shown. When information regarding subscriptions is obtained by a local subscription manager, subscription information repository 164 may be updated to reflect the information. For example, the local subscription manager may (if the information so indicates) perform actions to modify a host device (e.g., adding or removing functionality, access to various components, etc.) and add information to subscription information repository 164 such that limitations on a subscription may be identified and changes to implement the subscription reverted upon subscription limits being exceeded.

Subscription information repository 164 may include any number of entries 180, 188. Each of entries 180, 188 may correspond to a different current subscription. Each of entries 180, 188 may include a subscription identifier 182, subscription limitations 184, and one or more actions 186.

Subscription identifier 182 may identify to which subscription an entry corresponds. For example, subscription identifier 182 may be implemented with numerical identifiers (e.g., 1, 2, 3 . . . ). These integers may correspond with similar information maintained by the subscription management service such that common entries associated with the same subscription may be easily identifiable.

Subscription limitations 184 may specify one or more limitations (if any exist, in some cases no limitations may exist if a feature/function/component is enabled forever without limitation) regarding a subscription identified by subscription identifier 182. Subscription limitations 184 may specify, for example, time limits, expiration points in time, operational use limits (e.g., such as numbers of operations a graphic processor, accelerator, or other device may perform), and/or other information regarding limits on a subscription. Different subscriptions may have different subscription limitations (e.g., may expire at different times) The operation of a host system may be compared to the information in subscription limitations 184 to ascertain whether a subscription limitation has been exceeded.

One or more actions 186 may specify actions to be performed upon a subscription limit specified by subscription limitations 184 being exceeded. The actions may include, for example, depowering a hardware component, disabling software/hardware components, modifying a configuration of a software/hardware component, etc. In an embodiment, the one or more actions 186 include one or more executable (e.g., by a processor) code blocks. The code blocks, when executed, may cause actions to be performed that may cause changes made to a host device when a subscription is initiated to be reverted or to otherwise remove features, functions, and/or other aspects of a subscription that is no longer in force (e.g., when a subscription limit is exceeded). In some embodiments, the one or more actions 186 may include one or more references to actions stored in action repository 166 such that various actions specified by action repository 166 may be aggregated and performed. Like action repository 166, one or more actions 186 may specify actions for invoking the functionality of a power manager, restarting/initializing a host managed system, interrupting a boot process to selectively power devices prior to a startup management entity identifying the presence of hardware resources, and/or allow the startup process to resume after the hardware resources are selectively powered.

Subscription information repository 164 may include any number of entries, with each entry specifying similar and/or different information.

Like the information in subscription information repository 164, a subscription management service may store similar information. However, in addition to the information included in the entries shown in FIG. 1D, the information stored by the subscription management system may include two different sets of one or more actions. A first set of the one or more actions may cause (when the first set of actions are performed) a feature, function, and/or other aspect of a host device to be modified such that the host device is able to provide features/functionalities associated with the subscription. For example, a first set of one or more actions may include powering a depowered component such that it becomes utilized by operation managers (e.g., 152) and/or applications (e.g., 154) of a host device. A second set of the one or more actions may cause (when the second set of actions are performed) a feature, function, and/or other aspect of a host device to be modified such that the host device is not able to provide features/functionalities associated with the subscription. For example, a second set of one or more actions may include depowering a powered component that was previously powered to implement a subscription such that the power is no longer utilized by operation managers (e.g., 152) and/or applications (e.g., 154) of a host device.

Figure 2:
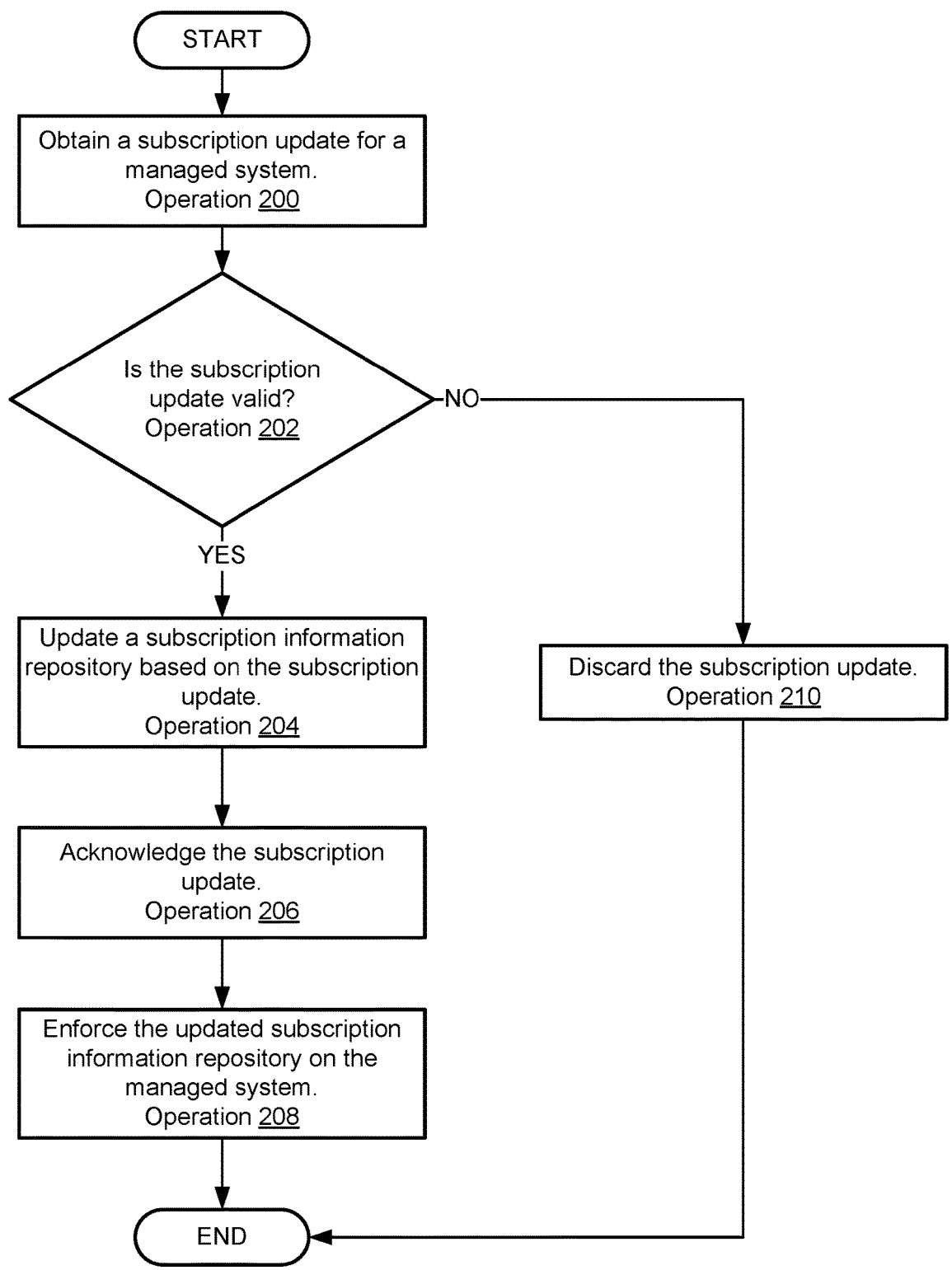
FIG. 2 shows a flow diagram illustrating a method of processing a subscription update in accordance with an embodiment.
Figure 3:
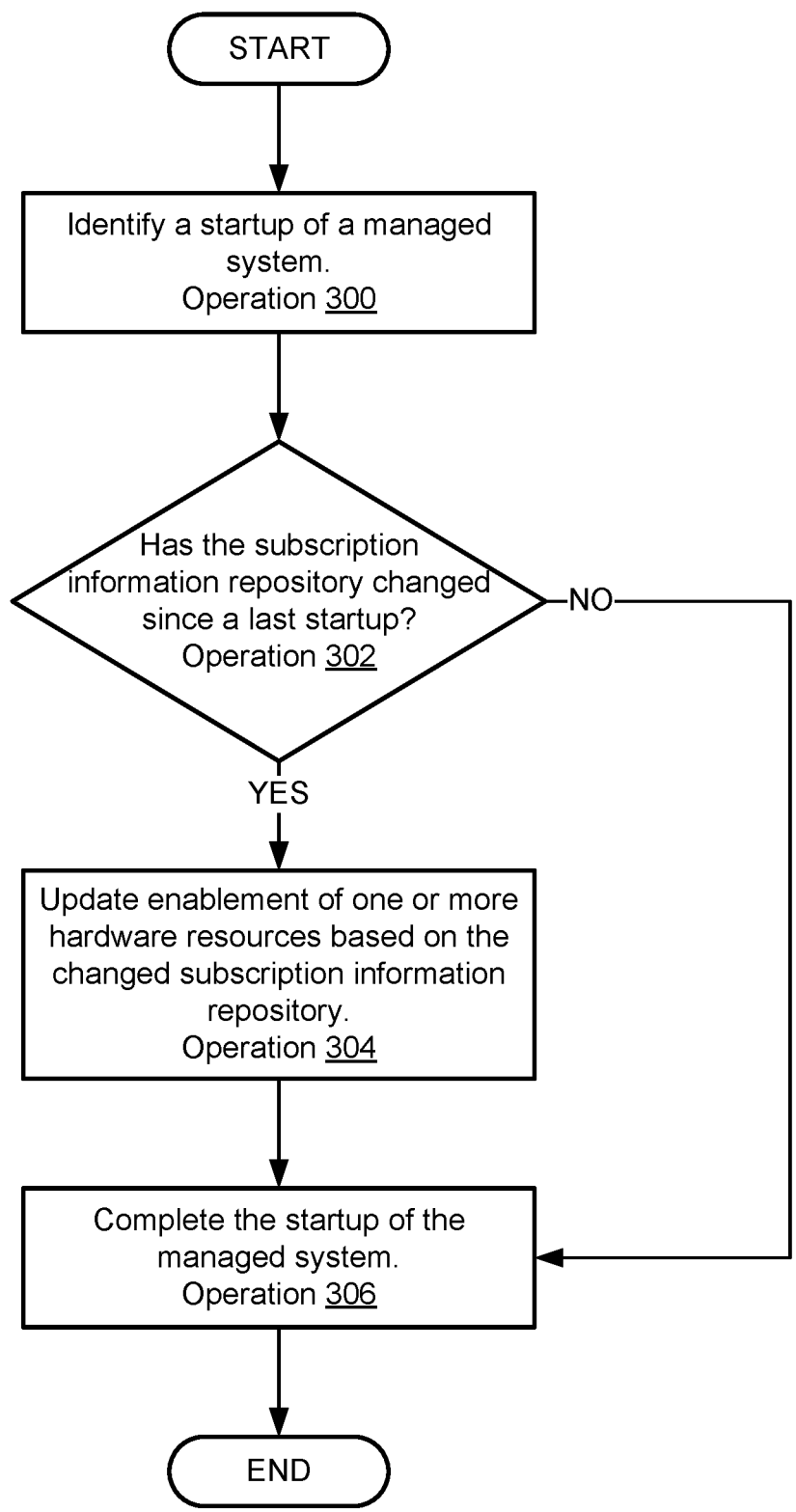
FIG. 3 shows a flow diagram illustrating a method of enforcing subscriptions on a managed system in accordance with an embodiment.

As discussed above, the components of FIG. 1A may perform various methods to provide computer implemented services using managed systems. FIGS. 2-3 illustrate examples of methods that may be performed by the components of FIG. 1A. For example, a local subscription manager of a managed system may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of processing a subscription update in accordance with an embodiment is shown. The method illustrated in FIG. 2 may be performed when a person changes a subscription associated with a managed system. For example, a person may utilize the subscription management service 10 to add a new subscription for a managed system to modify the operation of the managed system. Doing so may prompt the subscription management service 10 to generate and provide the subscription update to the managed system.

At operation 200, a subscription update for a managed system is obtained from a subscription management system. The subscription update may be obtained by a local subscription manager. For example, the subscription update may be obtained by receiving it in a message from the subscription management service via a communication system. The subscription update may be obtained via other methods (e.g., public subscribe systems, pull rather than push, etc.) without departing from embodiments disclosed herein.

In an embodiment, the subscription update specifies (i) a subscription identifier, (ii) one or more subscription limitations, (iii) one or more subscription enablement actions (e.g., and/or identifiers usable to index to various actions in an action repository), and (iv) one or more subscription disablement actions (e.g., and/or identifiers usable to index to various actions in an action repository).

At operation 202, it is determined whether the subscription update is valid. A subscription update may be considered valid when it can be determined that a subscription management system (e.g., tasked with managing a host managed system which hosts a local subscription manager performing all, or some, of the method illustrated in FIG. 2) generated, provided, and/or otherwise originated the subscription update (e.g., and/or the contents of the subscription update can be authenticated). The determination may be made via any method without departing from embodiments disclosed herein.

For example, in an embodiment, the determination may be made by determining whether the subscription update includes authentication data (e.g., such as a bearer token) usable to ascertain whether the subscription update was originated by the subscription management service. If such information is included in, with, and/or otherwise associated with the subscription update, then the subscription update may be determined as being valid.

In another example, in an embodiment, the determination may be made by checking with the subscription management service. For example, the local subscription manager may establish a secure communication channel (e.g., via a public-private key exchange and negotiated session key for securing communications between these components) with the subscription management service through which information may be exchanged. The information may include, for example, portions of the subscription update, information derived from the subscription update, some authentication data in and/or associated with the subscription update, and/or other types of information usable by the subscription management service to determine whether it originated the subscription update. If the subscription management service determines that it originated the subscription update, then the subscription management service may determine that the subscription update is valid and notify the local subscription manager of the determination.

If it is determined that the subscription update is valid, then the method may proceed to operation 204. Otherwise, the method may proceed to operation 210 following operation 202.

At operation 204, a subscription information repository is updated based on the subscription update. The subscription information repository may be updated by, for example, adding a new entry indicating a new subscription, removing an entry indicating termination of a subscription, and/or modifying an entry indicating a change in the subscription. In this manner, the information included in subscription information repository may be updated to all for discrimination between hardware resources are to powered from other hardware resources that are to be depowered during operation of the host managed system. An updated subscription information repository may be obtained by updating the subscription information repository.

At operation 206, the subscription update is acknowledged. The subscription update may be acknowledged by, for example, sending a message (and/or using other mechanisms to provide information) to an entity (e.g., a subscription management service tasked with managed the host managed system) associated with the subscription update. The message may indicate, for example: (i) that the host managed system is in compliance with subscription maintained by the subscription management service, (ii) changes made to the operation of the host managed system to comply with the subscription update, (iii) any information indicating deviation or inability to comply with the subscription update, and/or (iv) other types of information usable by the subscription management service to manage the host managed system to comply with the subscriptions associated with the host managed system.

In an embodiment, the subscription update is acknowledged before the host managed system is placed into compliance with the subscription update even while the acknowledgement indicates that the host managed system is in compliance with the subscription update, and subscriptions maintained by a subscription management service. Thus, there may be a discrepancy between the operation of the host managed system and the subscriptions maintained by the subscription management service.

At operation 208, the updated subscription information repository is enforced on the host managed system. The updated subscription information repository may be enforced by, for example, selectively power and depowering hardware resources of the host managed system by invoking the functionality of a power manager. To do so, the local subscription manager may provide the power manager with information indicating which hardware resources are to be powered and other hardware resources that are to be depowered.

In an embodiment, the powering/depowering of the hardware resources are performed in manner that disguises the presence of depowered hardware resources from management entities of the host managed system. Consequently, the depowered hardware resources may not be utilized by users of the host managed system.

Enforcing the updated subscription information repository may be performed while, for example, the local subscription manager is unable to communicate with the subscription management service. Consequently, users of the host managed system may be unable to prevent various subscriptions from being enforced on the hosted managed system by, for example, disconnecting it from the Internet.

In an embodiment, the updated subscription information repository is enforced using the method illustrated in FIG. 3. The updated subscription information repository may be enforced using other methods without departing from embodiments disclosed here.

The method may end following operation 208.

Returning to operation 202, the method may proceed to operation 210 following operation 202 when it is determined that the subscription update is not valid.

At operation 210, the subscription update is discarded. Consequently, the subscription information repository may not be updated. In this scenario, discarding the subscription update may keep the host managed system in compliance with subscriptions maintained by the subscription management service whereas implementing the subscription update may place it out of compliance (e.g., one or more hardware components may be in an undesired power state).

The method may end following operation 210.

Using the method illustrated in FIG. 2, a managed system may be placed in a state consistent with a subscription maintained by a subscription management service, and in a state where features added to the managed system may be removed or otherwise reverted automatically upon an occurrence of a subscription limitation being exceeded.

Turning to FIG. 3, a flow diagram illustrating a method of enforcing compliance with subscriptions in accordance with an embodiment is shown. The method may be performed, in part, by a local subscription manager that previously obtained information regarding a subscription (e.g., a subscription update) for a managed system hosting the local subscription manager.

At operation 300, a startup of the managed system (e.g., a host managed system for the local subscription manager) is identified. The startup may be any process where the managed system goes through a process of identifying its hardware resources, loading various software components, and/or otherwise prepares for/completes handoff of management of the managed system to a management entity such as an operating system.

The startup may be identified by detecting a power cycling and/or power on of the host managed system. The startup may be identified via other methods without departing from embodiments disclosed herein.

In an embodiment, the startup of the managed system is initiated by the local subscription manager. For example, after the updated subscription information repository is obtained as described with respect to FIG. 2, the local subscription manager may initiate startup of the managed system (e.g., regardless of a power state of the host managed system). To do so, the local management system may, for example, send a request, instruction, and/or other information to a management entity that manages operation of the host managed system that indicates that it is to proceed to its startup process (e.g., even if a startup process has been previously successfully completed and the host managed system is operating in an otherwise expected/desirable manner).

In an embodiment, when the startup is identified, the local subscription manager interrupts the startup. For example, the normal actions performed during a startup may be temporarily suspended. The startup may be interrupted prior to performance of a portion of the startup where a management entity (e.g., a BIOS) identifies hardware resources that it may utilize.

At operation 302, a determination is made regarding whether a subscription information policy (e.g., hosted by the local subscription manager). The determination may be made, for example, based on the contents of the subscription information policy. For example, the subscription information policy may include a flag (or may be a separate data structure associated with the subscription information repository) which is set automatically when all, or a portion, of its content is changed. The determination may be made via other methods without departing from embodiments disclosed herein.

The method may proceed to operation 304 when it is determined that the subscription information repository has been changed. Otherwise the method may proceed to operation 306 following operation 302.

At operation 304, enablement of one or more hardware resources is updated based on the changed subscription information repository. In an embodiment, the enablement is updated by selectively powering and/or depowering the hardware resources, or portions thereof, based on the information included in the subscription information repository. The enablement may be updated by providing a power manager with information regarding which of the hardware resources are to be powered and other hardware resources are to be depowered. In turn, the power manager may selectively power these hardware resources accordingly.

In an embodiment, the power manager may retain information regarding which hardware resources are to be powered. Consequently, only information regarding changes from previously implemented powering of the hardware resources may need to be provided to power manager during operation 304.

In an embodiment, the flag in or associated with the subscription information repository is reset (e.g., set to indicate no changes) once the enablement of the one or more hardware resources is updated.

At operation 306, the startup of the managed system may be completed. For example, the startup may be resumed after operation 304. Resuming the startup may cause the power manager to selectively power the hardware resources in accordance with the expectations of the local subscription manager. Consequently, the management entity of the host manage system performing the startup may only become aware of the powered hardware resources. The other hardware resources may be disguised or otherwise hidden from the startup management entity such that the startup management entity and/or other management entities, to which the startup management entity hands off operation management of the host managed system, do not utilize the other hardware resources.

The method may end following operation 306.

In an embodiment, the method illustrated in FIG. 3 is performed by the local subscription manager while it is unable to communicate with a subscription management service.

Turning to FIG. 4A, example actions and interactions between deployment 400, user device 410, subscription management service 420, and managed systems supply 430 in accordance with an embodiment are shown. Like named components in FIG. 4A and FIG. 1A may be similar.

Deployment 400 may be a datacenter or other type of computing environment that provides desired computer implemented services. A user, that operates user device 410, may be tasked with managing the operation of deployment 400 by managing subscriptions and requesting managed systems from subscription management service 420 and managed systems supply 430.

Now, consider a scenario where the user of user device 410 identifies that the computer implemented services provided by deployment 400 no longer meet responsiveness expectations for lack of hardware resources. In response to the determination, at block 1, the user may utilize user device 410 to send a request to subscription management service 420 for three additional managed systems. Based on the request, at block 2, subscription management service 420 selected three manages systems that have at least the quantity of hardware resources necessary to meet the needs specified by the user. Once selected, managed systems supply 430 (e.g., a logistics system that manages shipping of various managed systems to various locations, such as deployment 400) prepares and sends the managed systems to deployment.

While the selected managed systems have all of the hardware resources necessary to meet the user's goals, the selected managed systems include additional hardware resources beyond those necessary to meet the user's goals. To meet cost goals, subscription management service 420 selects a subscription that results in these excess hardware resources not being available for use by the user and organization.

Figure 4B:
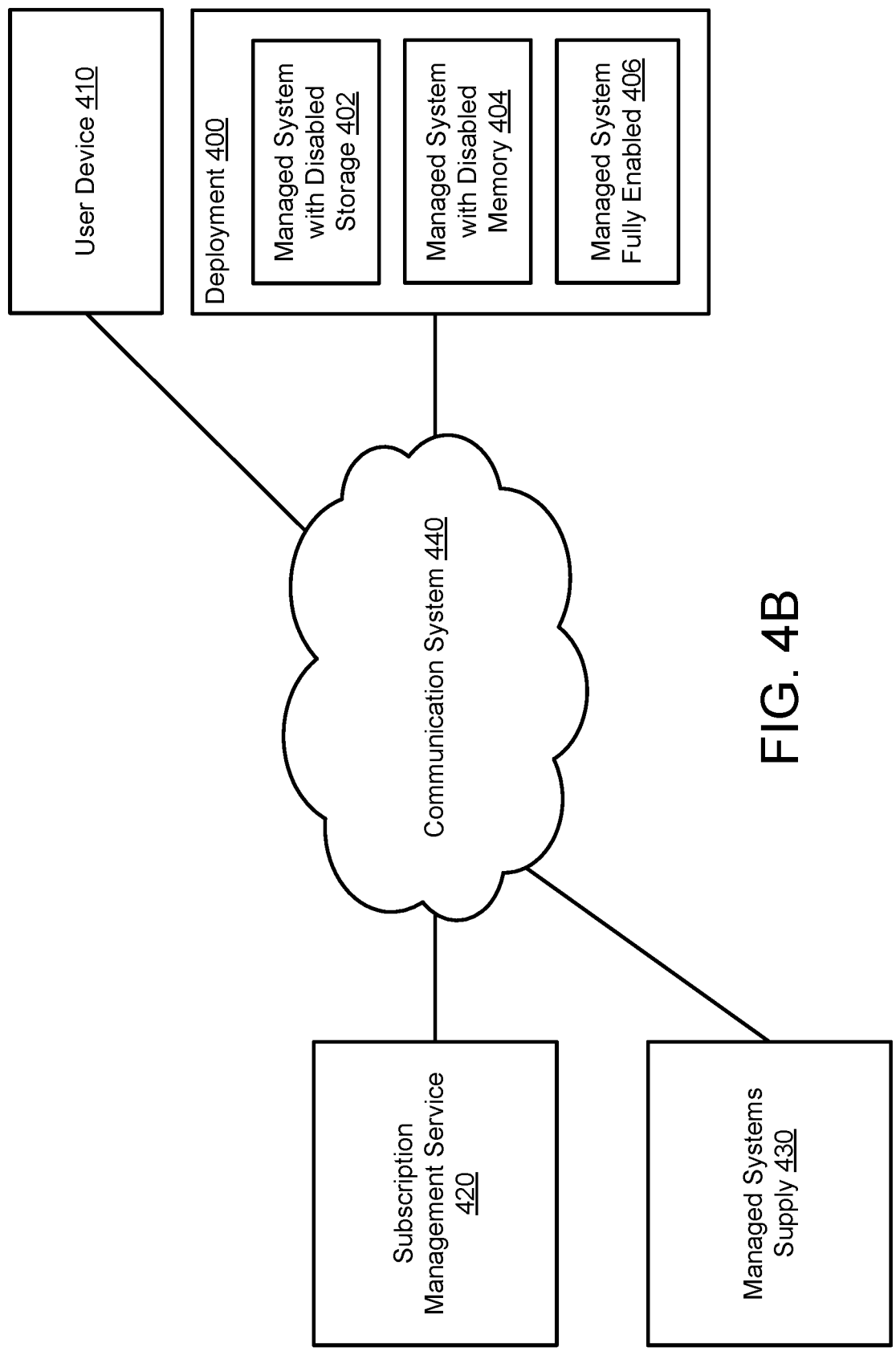

For example, turning to FIG. 4B, three managed systems 402, 404, 406 may be provided and placed in deployment 400. Each of these managed systems may be similar to that illustrated in FIG. 1B.

As discussed above, to meet cost goals, subscription management service 420 may have established a first subscription for managed system 402 that disables a storage (which its enablement would exceed cost goals and provide unnecessary levels of performance for the user), a second subscription for managed system 404 that disables a memory, and a third subscription for managed system 406 that fully enables it. Consequently, the deployment 400 begins to provide, using managed systems 402, 404, 406 computer implemented services in a manner as desired by the user of user device 410.

Figure 4C:
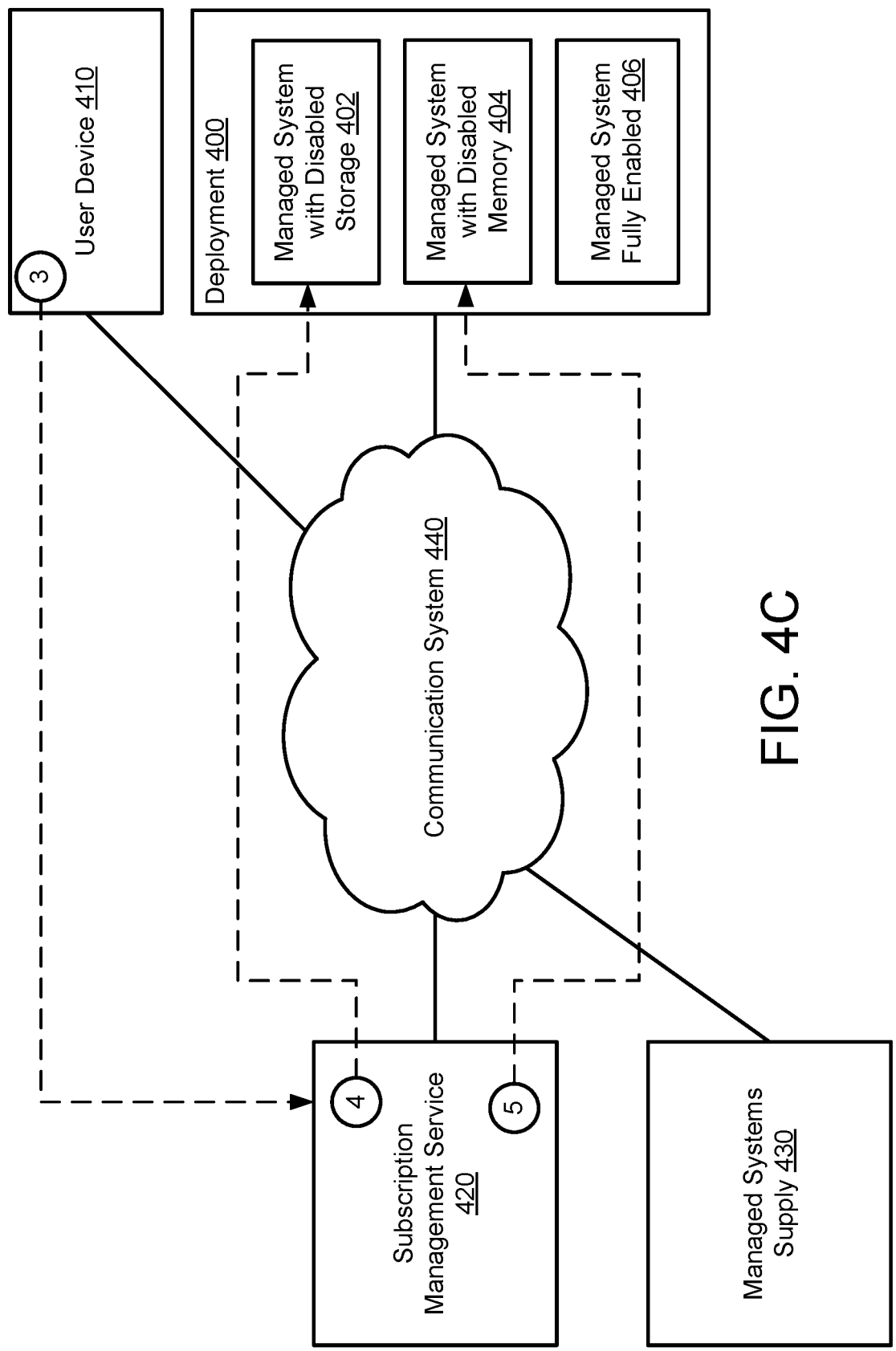

Turning to FIG. 4C, now consider a second point in time following that shown in FIG. 4B where the computational needs for performing the computer implemented services begins to increase. In response, the user of user device 410 may, at block 3, send a request to subscription management service 420 to expand its subscription to include the disabled storage and the disabled memory.

In response, the subscription management service 420 may, at blocks 4 and 5 respectively, send subscription updates to managed system 402 and managed system 404. These subscription updates may indicate that the storage and memory have been subscribed to by the user.

Figure 4D:
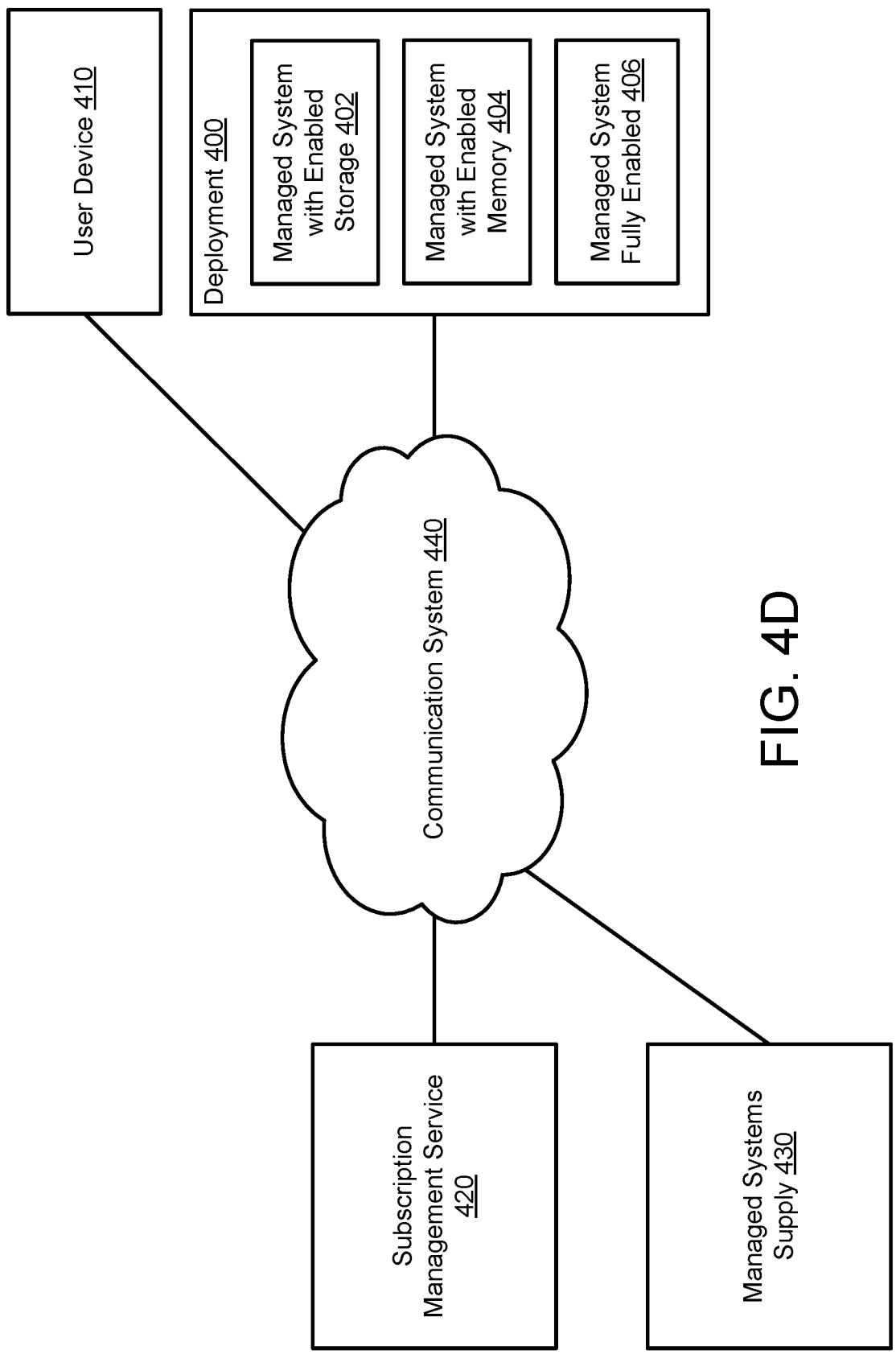

Turning to FIG. 4D, the local subscription managers of managed systems 402, 404 enable the storage and memory by perform the methods discussed and described in FIGS. 2-3. In this manner, the computational capabilities of managed systems 402, 404, 406 may be expanded for use by the user and corresponding organization without need to modify the hardware resources of these systems.

Figure 4E:
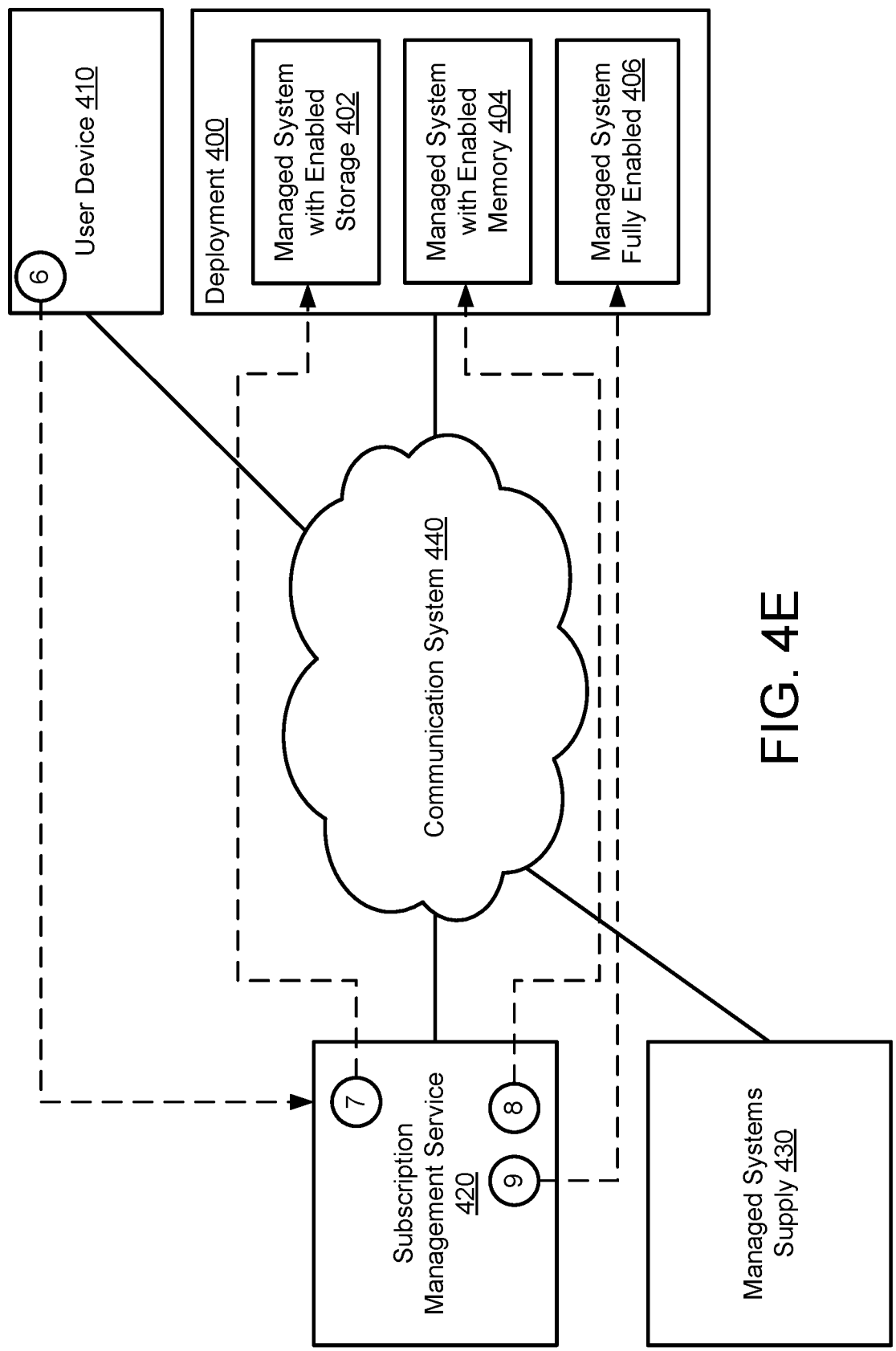

Turning to FIG. 4E, consider that at a third point in time, the computational resources needed to store data to provide the computer implemented services greatly diminishes. In such a scenario, the organization that operates deployment 400 may be able to save cost by modifying their subscriptions. Accordingly, a user of user device 410, at block 6, sends a request to subscription management service 420 to reduce its subscriptions for managed systems 402, 404, 406 to only those necessary. In response, at blocks 8 and 9, subscription management service 420 generates and sends subscriptions updates to managed systems 402, 404, 406 to exclude some of the storage devices of managed systems 402, 404, 406 from use.

Figure 4F:
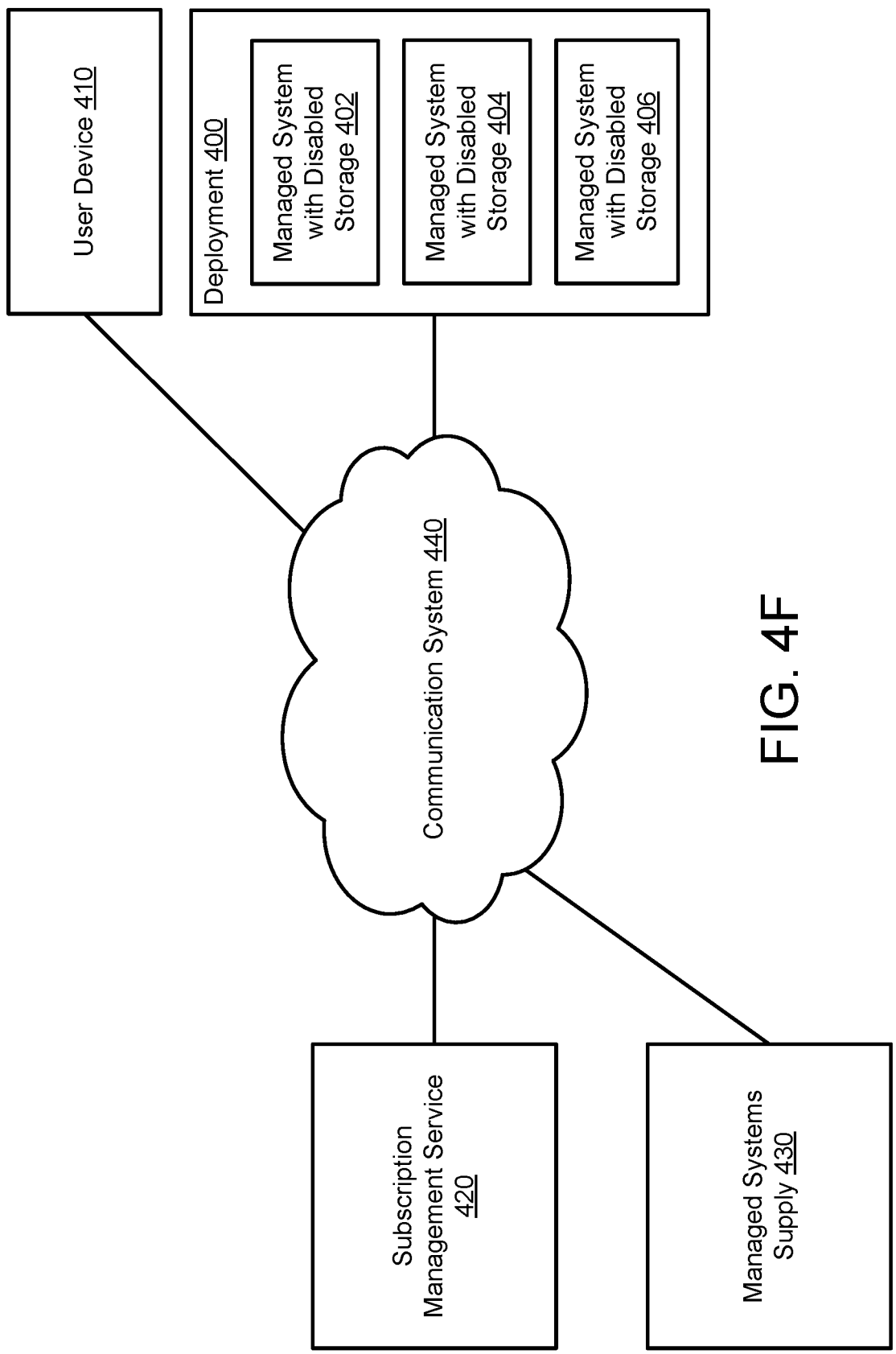

Turning to FIG. 4F, the local subscription managers of managed systems 402, 404 disable the storage by performing the methods discussed and described in FIGS. 2-3. In this manner, the computational capabilities of managed systems 402, 404, 406 may be reduced for use by the user and corresponding organization without need to modify the hardware resources of these systems. Further, the hardware resources may still be in place such that they may be returned to use by the user and corresponding organization in the future, should need arise.

Thus, via the processes illustrated in FIGS. 4A-4F, embodiments disclosed herein may provide for the automatic resizing, readjusting, and otherwise dynamic reconfiguration of managed system to ensure goals of the users of the managed systems are met without incurring an undue cost for meeting the user goals.

Figure 5:
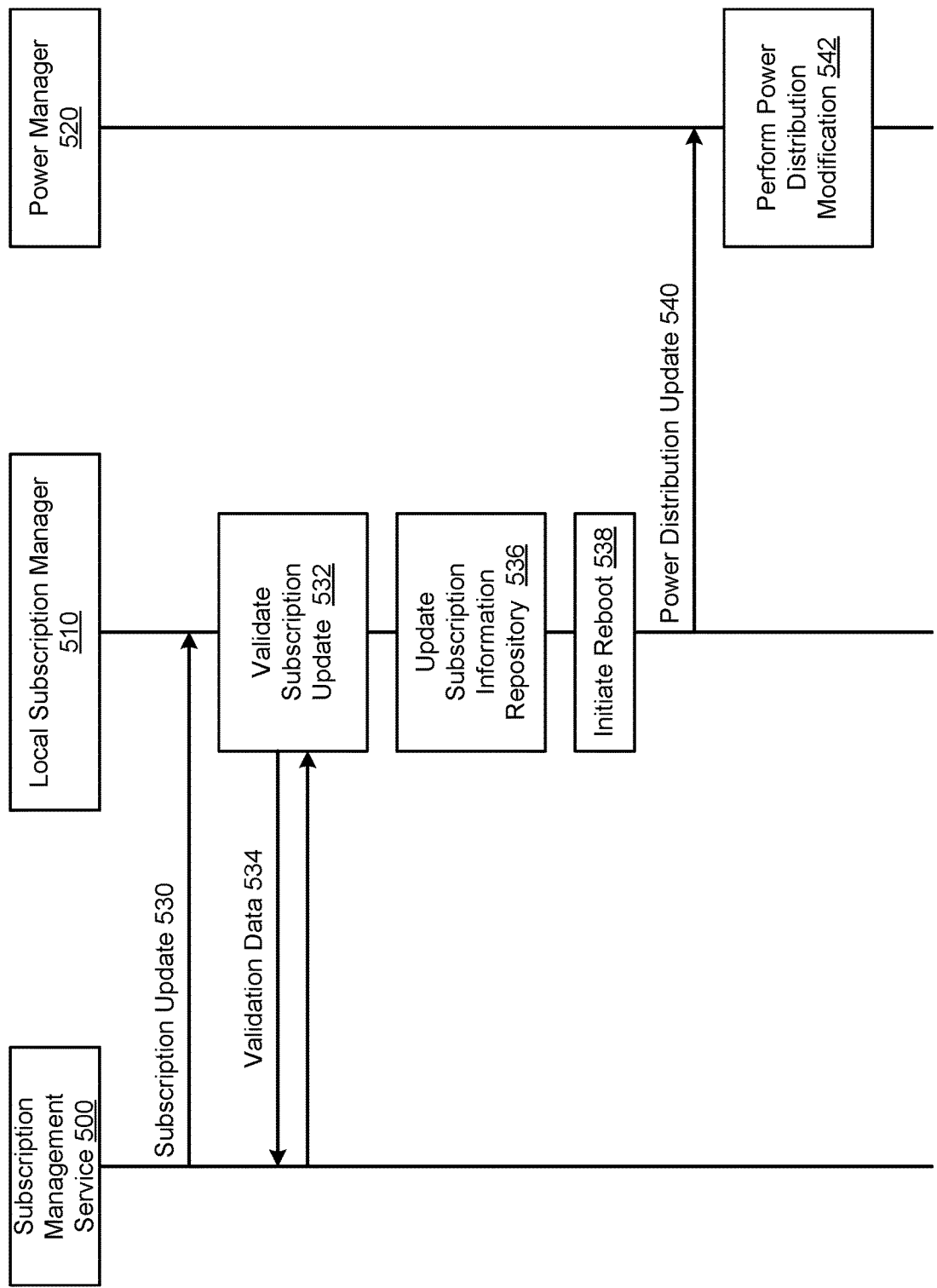
FIG. 5 shows a diagram illustrating interactions between and actions of components of a system in accordance with an embodiment.

As part of the aforementioned processes, various subscription updates may be received and processed by local subscription managers of the managed systems. Turning to FIG. 5, example actions and interactions between subscription management service 500, local subscription manager 510 of a host managed system (e.g., managed by subscription management service 500), and power manager 520 (e.g., of the host managed system) in accordance with an embodiment are shown. Like named components in FIG. 5 and FIG. 1A may be similar.

In FIG. 5, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

At block 530, subscription management service 500 generates and provides a subscription update to local subscription manager 510. In response local subscription manager 510, at block 532, performs a validation of the subscription update. To do so, the local subscription manager 510 and subscription management service 500 may exchange validation data with each other, at block 534.

In this example scenario, the exchanged validation data establishes that the subscription update is valid. If it were not validated, local subscription manager 510 may discard the subscription update.

Once validated, local subscription manager 510, at block 536, updates subscription information repository based on the subscription update. Consequently, the updated subscription information repository may indicate that one or more hardware components of the host managed system that is previously powered or depowered should be depowered or powered, respectively.

Once updated, local subscription manager 510, at block 538, initiates a reboot of the host managed system. Once started, local subscription manager 510 interrupts a startup of the host managed system to send a power distribution update, at block 540, to power manager 520. The power distribution update indicates the change in powering of the one or more hardware components. Consequently, at block 542, power manager 520 performs a power distribution modification to depower or power a hardware resource of the host managed system. After the power distribution modification is complete, then the host managed system may be resumed. Consequently, the host managed system may begin to utilize the newly powered hardware resource or may disuse the newly depowered component, depending on the power distribution modification performed in block 542.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

As discussed above, various components may be implemented with computing devices. For example, any of the components illustrated in FIGS. 1A-5 may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components.

These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux, UnixR, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Interconnect 610 may, in an embodiment, also supply power from power manager 157 to any of the components shown in FIG. 6. To manage such power distribution, power manager 157 may selectively distribute power. Alternatively, one or more of switch 650, which may be a part of interconnect 610, a motherboard (e.g., circuit card), and/or other power distribution system may be selectively actuated by power manager 157 to selectively distribute power to any of the components shown in FIG. 6. Consequently, any of the components may be selectively powered/depowered to manage use of the hardware components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for operating a managed system, the method comprising:
  obtaining, by a local subscription manager disposed within a body of the managed system, a subscription update for the managed system, the local subscription manager storing a subscription information repository;
  making a determination, by the local subscription manager, that the subscription update is a valid subscription update;
  in response to the determination and by the local subscription manager:

updating the subscription information repository stored in the local subscription manager based on the subscription update to obtain an updated subscription information repository, the subscription information repository specifying hardware components of the managed system that are to be powered and the updated subscription information repository specifying at least one of the hardware components to be powered that is not to be powered;

causing, upon obtaining the updated subscription information repository, a reboot of the managed system;

after the managed system has started the reboot, interrupting the reboot;

while the reboot is interrupted, providing a power distribution update to a power manager of the managed system to cause the power manager to perform the power distribution update to power or depower each of the one or more hardware components of the managed system based on the subscription update in the updated subscription information repository; and after the power manager has performed the power distribution update, causing the managed system to resume and complete the reboot to obtain a hardware component subscription compliant managed system that reflects changes between the subscription information repository and the updated subscription information repository.

2. The computer-implemented method of claim 1, wherein the determination is made when it is determined that the subscription update originated from a subscription management service that is tasked with managing the managed system.

3. The computer-implemented method of claim 2, wherein determining that the subscription update originated form the subscription management service comprises:
 performing an authentication for the subscription update using, in part, a public key for the subscription management service.

4. The computer-implemented method of claim 2, wherein determining that the subscription update originated form the subscription management service comprises:
 performing an authentication for the subscription update using, in part, a bearer token embedded in the subscription update, the bearer token being issued by the local subscription manager to the subscription management service up successful completion of a public-private key exchange mutual authentication.

5. The computer-implemented method of claim 1, wherein performing the power distribution update by the power manager comprises:
 depowering a hardware component of the one or more of the hardware components that was powered before the reboot of the managed system while the subscription information repository governed power states of the hardware components of the managed system, or
 powering the hardware component of the one or more of the hardware components that was in a depowered state before the reboot of the managed system while the subscription information repository governed the power states of the hardware components of the managed system.

6. The computer-implemented method of claim 5, wherein powering the hardware component comprises instructing the power manager to supply power to the hardware component, and wherein the power manager comprises a configurable power interconnect between a power supply and the hardware component.

7. The computer-implemented method of claim 1, wherein the hardware component subscription compliant managed system is in compliance with subscriptions maintained by a subscription management service.

8. A non-transitory machine-readable medium having instructions stored therein, which when executed by a processor, cause the processor to perform operations for operating a managed system, the operations comprising:
 obtaining, by a local subscription manager disposed within a body of the managed system, a subscription update for the managed system, the local subscription manager storing a subscription information repository;
 making a determination, by the local subscription manager, that the subscription update is a valid subscription update;
 in response to the determination and by the local subscription manager:
  updating the subscription information repository stored in the local subscription manager based on the subscription update to obtain an updated subscription information repository, the subscription information repository specifying hardware components of the managed system that are to be powered and the updated subscription information repository specifying at least one of the hardware components to be powered that is not to be powered;
  causing, upon obtaining the updated subscription information repository, a reboot of the managed system;
  after the managed system has started the reboot, interrupting the reboot;
  while the reboot is interrupted, providing a power distribution update to a power manager of the managed system to cause the power manager to perform the power distribution update to power or depower each of the one or more hardware components of the managed system based on the subscription update in the updated subscription information repository; and
  after the power manager has performed the power distribution update, causing the managed system to resume and complete the reboot to obtain a hardware component subscription compliant managed system that reflects changes between the subscription information repository and the updated subscription information repository.

9. The non-transitory machine-readable medium of claim 8, wherein the determination is made when it is determined that the subscription update originated from a subscription management service that is tasked with managing the managed system.

10. The non-transitory machine-readable medium of claim 9, wherein determining that the subscription update originated form the subscription management service comprises:
 performing an authentication for the subscription update using, in part, a public key for the subscription management service.

11. The non-transitory machine-readable medium of claim 9, wherein determining that the subscription update originated form the subscription management service comprises:
 performing an authentication for the subscription update using, in part, a bearer token embedded in the subscription update, the bearer token being issued by the local subscription manager to the subscription management service up successful completion of a public-private key exchange mutual authentication.

12. A managed system, comprising:
a processor; and
a local subscription manager disposed within a body of the managed system that is adapted to perform operations for managing operation of the managed system to comply with subscriptions, the operations comprising:
   obtaining, by the local subscription manager of the managed system, a subscription update for the managed system, the local subscription manager storing a subscription information repository;
   making a determination, by the local subscription manager, that the subscription update is a valid subscription update;
   in response to the determination and by the local subscription manager:
   updating the subscription information repository stored in the local subscription manager based on the subscription update to obtain an updated subscription information repository, the subscription information repository specifying hardware components of the managed system that are to be powered and the updated subscription information repository specifying at least one of the hardware components to be powered that is not to be powered;
      causing, upon obtaining the updated subscription repository, a reboot of the managed system;
         after the managed system has started the reboot, interrupting the reboot;
         while the reboot is interrupted, providing a power distribution update to a power manager of the managed system to cause the power manager to perform the power distribution update to power or depower each of the one or more hardware components of the managed system based on the subscription update in the updated subscription repository; and
         after the power manager has performed the power distribution update, causing the managed system to resume and complete the reboot to obtain a hardware component subscription compliant managed system that reflects changes between the subscription information repository and the updated subscription information repository.

13. The managed system of claim 12, wherein the determination is made when it is determined that the subscription update originated from a subscription management service that is tasked with managing the managed system.

14. The managed system of claim 13, wherein determining that the subscription update originated form the subscription management service comprises:
   performing an authentication for the subscription update using, in part, a public key for the subscription management service.

15. The method of claim 1, wherein the body of the managed system is a chassis of the managed system, the local subscription manager is an out of band (OOB) management controller disposed within the chassis, and the managed system being a computing device that comprises, within the chassis, the hardware components that are or are not to be powered.

16. The method of claim 15, wherein the local subscription manager comprises a storage that is separate and distinct from a storage of the managed system, the storage of the managed system being one of the hardware components within the chassis of the managed system, and the subscription information repository is stored in the storage of the local subscription manager.

17. The method of claim 1, wherein after obtaining the updated subscription information repository and before enforcing the updated subscription, the method further comprises:
   determining, by the local subscription manager, information indicating an inability of the managed system to comply with the subscription update; and
   reporting, by the local subscription manager and to a subscription management service from which the subscription update originated, the information indicating the inability of the managed system to comply with the subscription update.

18. The method of claim 1, wherein after obtaining the updated subscription information repository and before enforcing the updated subscription, the method further comprises:
   acknowledging, by the local subscription manager, the subscription update by sending a message to a subscription management service from which the subscription update originated, the message indicating one or more changes to be made to the managed system to place the manages system in compliance with the subscription update.

19. The non-transitory machine-readable medium of claim 8, wherein the body of the managed system is a chassis of the managed system, the local subscription manager is an out of band (OOB) management controller disposed within the chassis, and the managed system being a computing device that comprises, within the chassis, the hardware components that are or are not to be powered.

20. The managed system of claim 12, wherein the body of the managed system is a chassis of the managed system, the local subscription manager is an out of band (OOB) management controller disposed within the chassis, and the managed system being a computing device that comprises, within the chassis, the hardware components that are or are not to be powered.

* * * * *